United States Patent
van den Heuvel

(10) Patent No.: US 9,927,017 B2
(45) Date of Patent: Mar. 27, 2018

(54) SHEAVE FOR GUIDING ROPE IN AN INDUSTRIAL MACHINE

(71) Applicant: Rene van den Heuvel, Haarle (NL)

(72) Inventor: Rene van den Heuvel, Haarle (NL)

(73) Assignee: AKTIEBOLAGET SKF, Gothenburg (SE)

( * ) Notice: Subject to any disclaimer, the term of this patent is extended or adjusted under 35 U.S.C. 154(b) by 17 days.

(21) Appl. No.: 15/131,345

(22) Filed: Apr. 18, 2016

(65) Prior Publication Data

US 2016/0305530 A1  Oct. 20, 2016

Related U.S. Application Data

(60) Provisional application No. 62/148,950, filed on Apr. 17, 2015.

(51) Int. Cl.
*F16H 7/20* (2006.01)
*F16H 55/36* (2006.01)
*F16H 55/50* (2006.01)
*F16C 13/00* (2006.01)
*F16H 7/08* (2006.01)

(52) U.S. Cl.
CPC ............ *F16H 55/50* (2013.01); *F16H 7/20* (2013.01); *F16C 13/006* (2013.01); *F16H 2007/0865* (2013.01)

(58) Field of Classification Search
CPC ............ F16C 2361/63; F16C 13/006; F16H 2007/0865; F16H 7/20; F01P 5/12
USPC ........................................... 474/199
See application file for complete search history.

(56) References Cited

U.S. PATENT DOCUMENTS

| | | | | |
|---|---|---|---|---|
| 2,039,875 A | * | 5/1936 | Benson | D01H 1/241 384/546 |
| 2,107,090 A | * | 2/1938 | Swennes | F04D 33/00 415/124.2 |
| 2,113,167 A | * | 4/1938 | Baumheckel | F04D 29/126 277/373 |
| 2,206,488 A | * | 7/1940 | Pavlecka | F04D 29/126 29/888.024 |
| 2,365,065 A | * | 12/1944 | Frankenfield | F16J 15/36 277/373 |
| 2,542,902 A | * | 2/1951 | Chubbuck | F04D 29/445 415/208.1 |
| 2,706,468 A | * | 4/1955 | Willcox | F01P 7/085 123/41.11 |
| 3,730,151 A | * | 5/1973 | Smith | F01P 7/087 123/41.12 |
| 3,796,510 A | * | 3/1974 | Korrenn | F16C 19/28 384/477 |
| 3,798,987 A | * | 3/1974 | Hurd | A01D 34/81 474/168 |
| 3,894,383 A | * | 7/1975 | Weis | A01D 34/63 474/181 |

(Continued)

*Primary Examiner* — Henry Y Liu
(74) *Attorney, Agent, or Firm* — Mark Ussai; SKF USA Inc. Patent Dept.

(57) ABSTRACT

A sheave assembly, apparatus, and method for assembly a sheave. The sheave assembly includes a hub, an axle, a bearing element disposed between the axle and the hub, and a sheave body disposed at least partially around the hub. The sheave assembly also includes an adapter coupled with the sheave body. The adapter and the hub at least partially define a flowpath that extends to the bearing element.

17 Claims, 3 Drawing Sheets

(56) References Cited

U.S. PATENT DOCUMENTS

| | | | | |
|---|---|---|---|---|
| 3,924,585 A * | 12/1975 | Woods | F01P 7/084 | 123/41.12 |
| 3,981,610 A * | 9/1976 | Ernst | F01P 5/12 | 123/41.12 |
| 4,074,662 A * | 2/1978 | Estes | F01P 7/084 | 123/41.12 |
| 4,282,960 A * | 8/1981 | Glasson | F16D 35/029 | 192/58.43 |
| 4,395,833 A * | 8/1983 | Neumann | E02F 3/905 | 277/320 |
| 4,425,520 A * | 1/1984 | Hiraga | B60H 1/3222 | 192/84.961 |
| 4,498,066 A * | 2/1985 | Fujiwara | F16D 67/06 | 188/164 |
| 4,645,432 A * | 2/1987 | Tata | F01P 5/12 | 415/10 |
| 4,715,780 A * | 12/1987 | Kan | B29C 45/1459 | 384/492 |
| 4,936,742 A * | 6/1990 | Eguchi | F04D 29/061 | 384/397 |
| 4,989,398 A * | 2/1991 | Kuhn | A01D 34/76 | 474/199 |
| 5,026,253 A * | 6/1991 | Borger | F04D 29/0465 | 384/573 |
| 5,044,908 A * | 9/1991 | Kawade | F01C 21/02 | 384/557 |
| 5,421,788 A * | 6/1995 | Toth | F16C 13/006 | 474/135 |
| 5,607,285 A * | 3/1997 | Eckel | F04D 29/106 | 415/216.1 |
| 5,690,471 A * | 11/1997 | Sasaki | F04D 29/106 | 277/353 |
| 5,785,491 A * | 7/1998 | Ozawa | F04D 11/00 | 415/111 |
| 5,989,151 A * | 11/1999 | Kershaw | F01P 7/048 | 123/41.12 |
| 6,241,257 B1 * | 6/2001 | Hauck | F16C 13/006 | 277/637 |
| 6,270,312 B1 * | 8/2001 | Heer | F04D 29/086 | 415/111 |
| 6,293,885 B1 * | 9/2001 | Serkh | F16C 13/006 | 474/133 |
| 6,450,907 B1 * | 9/2002 | Serkh | F16H 7/1236 | 474/117 |
| 6,524,011 B2 * | 2/2003 | Miyazaki | B60B 27/00 | 301/108.1 |
| 6,692,393 B2 * | 2/2004 | Fukuwaka | F16C 33/416 | 474/135 |
| 6,761,486 B2 * | 7/2004 | Miyazaki | B60B 27/00 | 29/898.063 |
| 6,811,003 B2 * | 11/2004 | Novak | B60B 27/00 | 188/72.1 |
| 6,893,368 B2 * | 5/2005 | Fujiwara | F16H 55/36 | 474/70 |
| 7,011,593 B2 * | 3/2006 | Schenk | F16C 13/006 | 384/477 |
| 7,144,225 B2 * | 12/2006 | Boffelli | F01P 5/12 | 417/223 |
| 7,563,187 B2 * | 7/2009 | Miyata | B65G 39/16 | 474/118 |
| 7,677,808 B2 * | 3/2010 | Shigeoka | B60B 27/0005 | 384/544 |
| 8,033,735 B2 * | 10/2011 | Furukawa | B60B 27/001 | 384/477 |
| 8,334,626 B2 * | 12/2012 | Lange | B25F 5/008 | 310/47 |
| 8,465,211 B2 * | 6/2013 | Dougherty | B60B 27/001 | 384/477 |
| 8,591,118 B2 * | 11/2013 | Ishijima | B60B 7/00 | 301/105.1 |
| 8,651,988 B2 * | 2/2014 | Kapfer | F16C 13/006 | 474/101 |
| 8,734,099 B2 * | 5/2014 | Takarai | F01P 5/12 | 415/206 |
| 8,783,964 B2 * | 7/2014 | Ishijima | B60B 7/00 | 301/110 |
| 8,905,879 B2 * | 12/2014 | Lannutti | F16C 13/006 | 384/481 |
| 8,920,141 B2 * | 12/2014 | Durand | F01P 5/12 | 417/423.12 |
| 2003/0008743 A1 * | 1/2003 | Cadarette | F16H 55/36 | 474/199 |
| 2004/0235599 A1 * | 11/2004 | Ozorak | F16C 13/006 | 474/199 |
| 2005/0026729 A1 * | 2/2005 | Schenk | F16C 13/006 | 474/101 |
| 2005/0031455 A1 * | 2/2005 | Boffelli | F01P 5/12 | 417/213 |
| 2006/0188191 A1 * | 8/2006 | Schenk | F16C 13/006 | 384/489 |
| 2008/0167149 A1 * | 7/2008 | Beauprez | F16H 57/04 | 474/93 |
| 2015/0267791 A1 * | 9/2015 | Hedman | F16H 7/20 | 474/199 |

* cited by examiner

SHEAVE FOR GUIDING ROPE IN AN INDUSTRIAL MACHINE

TECHNICAL FIELD

The present disclosure relates to sheaves for guiding ropes, for example, sheaves used in industrial machinery such as a paper machine.

BACKGROUND OF THE INVENTION

Paper machines may use multiple, sometimes multiple dozens or even hundreds, of rope sheaves as part of a rope carrier system. The rope threaded through these sheaves may be used, e.g., to thread paper tail into a paper machine. The rope carrier generally includes two ropes driven by the machine or an external driver, with the sheaves being idlers that are driven by the ropes.

Generally, the sheaves rely on a simple rotational support system. Two deep-groove ball bearings are disposed within a hub of a sheave body. The outer diameter of the bearing forms a light interference fit with the sheave body. A shaft is received through the inner diameter of the bearing ring, such that the sheave is supported and rotatable relative to the shaft.

The bearings are lubricated with grease, and typically maintaining the carrier system includes replacing the bearing grease, which may become contaminated. Such re-lubrication may require the machine to be brought to a standstill, which can leave the sheaves susceptible to corrosion. Further, sheaves in the "wet" section of the paper machine may experience high humidity, which may further corrode the bearings, while sheaves in the "dry" section may operate at high temperatures and in dusty environments, which may reduce the life of the grease. The sheaves may also be located in difficult to reach sections of the machine.

Thus, it may be desired to reduce the frequency with which the bearings are re-lubricated. One way this is handled is by over-lubricating the bearings. This can lead to leakage, which may manifest as spots on the paper product. Further, the sheaves of a single machine and/or multiple machines may come in a variety of sizes, and thus modifying the sheaves to avoid some of the aforementioned challenges may be costly.

SUMMARY OF THE INVENTION

Embodiments of the disclosure may provide a sheave assembly. The sheave assembly includes a hub, an axle, a bearing element disposed between the axle and the hub, and a sheave body disposed at least partially around the hub. The sheave assembly also includes an adapter coupled with the sheave body. The adapter and the hub at least partially define a flowpath that extends to the bearing element.

Embodiments of the disclosure may also provide an apparatus for carrying a rope. The apparatus includes a shaft, a hub coupled with the shaft so as to be stationary with respect thereto, an axle disposed at least partially within the hub, a plurality of bearing elements disposed between the hub and the axle, to rotatably support the axle with respect to the hub, and an adapter coupled with the sheave body. The adapter and the hub at least partially define a flowpath extending to the bearing elements. The apparatus also includes a seal disposed in the flowpath and sealing the flowpath.

Embodiments of the disclosure may also provide a method for assembling a sheave for rotatably carrying a force-transmitting member. The method includes coupling a hub to a shaft, such that the hub is stationary with respect to the shaft, and coupling an adapter to a sheave body. The method also includes rotatably supporting the sheave body, the adapter, and an axle coupled with the sheave body or coupled with the adapter, using bearing elements coupled with the hub. A flowpath is defined at least partially by the hub and the adapter, the flowpath extending from an exterior of the sheave to the bearing elements. The adapter is coupled with a flange of the axle to connect the sheave body with the axle, or the adapter is received around the shaft and at least partially covers an opening of the flowpath.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION OF THE INVENTION

Figure 1:
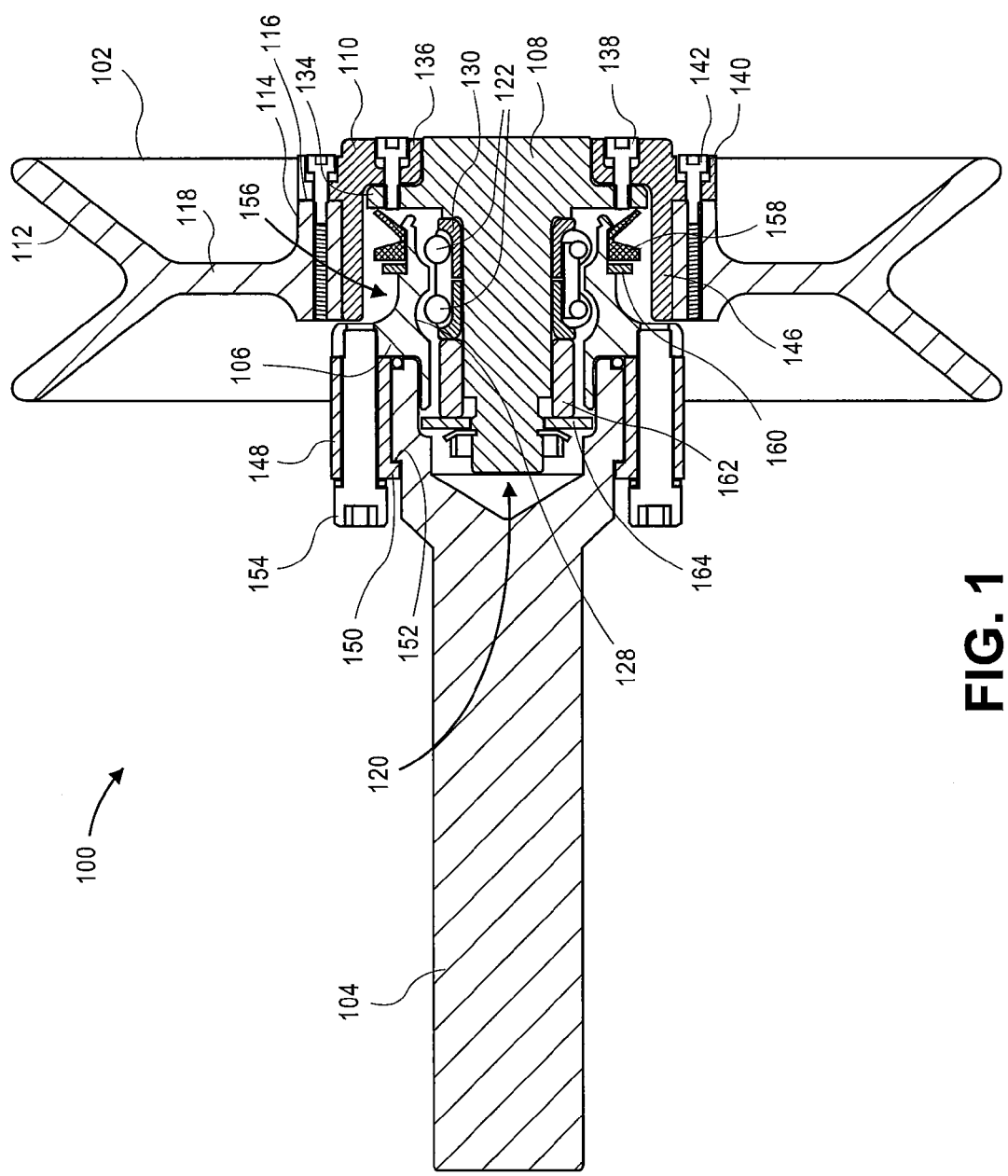
FIG. 1 illustrates a side, cross-sectional view of a sheave assembly, according to an embodiment.

The following detailed description refers to the accompanying drawings. Wherever convenient, the same reference numbers are used in the drawings and the following description to refer to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 illustrates a side, cross-sectional view of a sheave assembly 100, according to an embodiment. The sheave assembly 100 may generally include a rotatable sheave body 102, a shaft 104, a hub 106, an axle 108, and an adapter 110. The sheave body 102 may define a deep groove 112 configured to receive a force-transmitting member, e.g., a rope, cable, etc. Although a single groove 112 is shown, it will be appreciated that multiple grooves 104 designed to carry any number of force-transmitting members may be employed. The sheave body 102 may also include an inner ring 114, which may have an axial end face 116. The groove 104 may extend outward from the inner ring 114 and may be separated therefrom, for example, by a disk 118, as shown. Although a single sheave body 102 is shown, multiple sheave bodies 102 may be aligned and interconnected by a common support structure, and may have independent hubs, axles, etc.

Referring again to the embodiment illustrated in FIG. 1, the shaft 104 may be coupled with the hub 106 at an end thereof. Although illustrated as two separate pieces, it will be appreciated that the hub 106 and shaft 104 may be integrally formed from a single piece. In an embodiment, at least a portion of the hub 106 may be disposed within a hollow region 120 of the shaft 104.

The axle 108 may also be at least partially disposed within the hollow region 120, and at least partially radially inward of the hub 106. The axle 108 may be configured to rotate with respect to the hub 106 and the shaft 104, and may be supported by the hub 106 using a plurality of bearing elements 122. In an embodiment, the bearing elements 122 may include two rows of rolling elements, such as balls, cylinders, or the like. Although two rows are shown, it will be appreciated that any number of one or more rows may be employed. In an embodiment, the bearing elements 122 may be made at least partially from a ceramic material, but in others may be made at least partially from steel or another metal. Further, the bearing elements may be packed in grease, for example, a grease configured for a high number of cycles, e.g., Mobil PM 460.

The hub 106 may be formed so as to provide, e.g., integrally, as shown, an outer raceway 128 for the bearing elements 122; however, in other embodiments, a separate outer ring may be employed. By the hub 106 integrally providing the outer raceway 128, a remainder of the hub 106 may be integrally formed with the outer raceway 128, e.g., rather than providing an additional outer ring or raceway structure. In other embodiments, however, such additional outer rings may be included to provide the outer raceway. Further, the axle 108 may include inner bearing rings 130, e.g., one for each of the rows, which may define raceways for the bearing elements 122. However, in other embodiments, the axle 108 may be formed to provide inner raceways, and thus the inner rings 130 may be omitted. The combination of the hub 106, bearing elements 122, and the inner rings 130 (or the axle 108 when the bearing raceways are formed integrally therewith) may form a bearing to rotatably support the axle 108 in the hub 106.

The axle 108 may also include a flange 134, which may be integral with a remainder of the axle 108, or may be formed as a separate piece that is coupled to the remainder (or one or more additional pieces) of the axle 108. The flange 134 may be axially offset from the hub 104 and the bearing elements 122. The flange 134 may also extend radially outward of (e.g., to a position that as farther away from the central, rotational axis of the assembly 100 than) the bearing elements 122 and/or the hub 106.

The adapter 110 may be coupled with the axle 108. For example, the adapter 110 may include a first, inner ring 136 that may be coupled with the flange 134. In some embodiments, the adapter 110 may be fastened to the flange 136 using screws 138, or via bolts, rivets, clamps, or using any other fastening device or process. In other embodiments, the flange 134 may be welded, brazed, adhered, secured via interference fit, or otherwise coupled with the flange 134. In an embodiment, the adapter 110 may be coupled with the flange 134 such that the flange 134 is located axially between the first ring 136 of the adapter 110 and the bearing elements 122 and/or the hub 106. In some embodiments, the adapter 110 may include another ring, e.g., radially aligned with the first ring 136, which may be disposed on an opposite axial side of the flange 134, such that the first ring 136 and the other ring straddle the flange 134. In still other embodiments, the first ring 136 may be disposed on the opposite axial side of the flange 134, such that the first ring 136 is axially between the flange 134 and the hub 106 and/or bearing elements 122.

The adapter 110 may also include a second, outer ring 140, which may be disposed radially outward of the first ring 136, and may be coupled with the sheave body 102. In an embodiment, the second ring 140 may be coupled with the inner ring 114 of the sheave body 102. For example, the second ring. 140 may be fastened to the inner ring 114 of the sheave body 102 via screws 142, bolts, rivets, clamps, or any other fastening device or process. In another example, the second ring 140 may be welded, brazed, adhered, secured via interference fit, or otherwise coupled to the inner ring 114 of the sheave body 102. Further, in a specific embodiment, the second ring 140 may be coupled to the end face 116 of the inner ring 114 of the sheave body 102.

The adapter 110 may further include an axial extension 146. The axial extension 146 may be sized such that the outer diameter thereof is nearly the same, e.g., slightly less to facilitate installation or slightly more to form an interference fit, as the inner diameter of the inner ring 114 of the sheave body 102. Accordingly, the axial extension 146 may extend along the inner diameter of the inner ring 114, as shown, and may, in some embodiments, engage at least a portion of the inner diameter.

The sheave assembly 100 may also include a retaining ring 148 received at least partially around the shaft 104. In an embodiment, the retaining ring 148 may be received entirely around the shaft 104, e.g., forming a sleeve. Further, the retaining ring 148 may include an inside shoulder 150 that is sized to bear against a shoulder 152 of the shaft 104. This shoulder-to-shoulder engagement may prevent the retaining ring 148 from sliding over the end of the shaft 104. Further, the retaining ring 148 may be coupled with the hub 106, e.g., using screws 154 or any other suitable fasteners or other coupling processes (e.g., as described above).

The flange 124 may be spaced axially apart from the hub 106 and the bearing elements 122. Further, the sheave body 102 and/or the axial extension 146 of the adapter 110 may be spaced apart from the hub 106, e.g., as shown, radially, as proceeding from right-to-left, until reaching a curve of the hub 106, where the separation between the hub 106 and the axial extension 146 and/or sheave body 102 becomes axial. Accordingly, a flowpath 156 may be defined between the hub 106 on the inside and the adapter 110 on the outside, and the flange 124 of the axle 108 on the right side. This flowpath 156 may extend from an exterior of the assembly to the bearing elements 122. In an embodiment, the bearing elements 122 may include a seal such that the bearing elements 122 are at least partially sealed between the hub 106 and the axle 108; however, the flowpath 156 may still be considered to extend to the bearing elements 122.

To prevent leakage of lubricant and/or ingress of contaminants or corrosive elements, the sheave assembly 100 may include a seal 158 that substantially seals the flowpath 156. The seal 158 may be disposed around the hub 106. A stop ring 160 may also be disposed around the hub 106 and may provide a shoulder against which the seal 158 may bear in an axial direction. In some embodiments, the hub 106 may be integrally formed with the hub 106 and/or the outward sloping of the hub 106 may provide sufficient holding force for the seal 158, such that the stop ring 160 may be omitted.

The seal 158 may extend axially and/or radially from the hub 106 and may engage with the adapter 110 or, as shown, with the flange 124 of the axle 108. When engaging the axle 108, the installation of the axle 108 may serve to provide an axial compression of the seal 158. The seal 158 may resiliently deflect, such that sealing contact is established between the seal 158 and the axle 108.

In some embodiments, the sheave assembly 100 may also include a distance ring 162 and a no-drop lock 164. The distance ring 162 and the no-drop lock 164 may be disposed within the hollow region 120 of the shaft 104 and may be configured to engage therewith in order to prevent the sheave body 102 falling down.

In operation, the sheave body 102 rotates as the force-transmitting member (e.g., rope) is driven therethrough. When the sheave body 102 is rotated, the adapter 110 and the axle 108 are rotated therewith. The sheave body 102, adapter 110, and axle 108 are supported by engagement with the hub 106 via the bearing elements 122. Further, the retaining ring 148 prevents axial displacement of the sheave body 102, adapter 110, and axle 108 with respect to the shaft 104, thereby providing for stable rotation. Moreover, with the sealed design for the bearing elements, the lubricant thereof may be entrained in contact with the bearing elements 112 providing a suitable lubricant film for a long duration. Thus, the adapter 110 may allow an axle 108 sized for one operation to be expanded to carry a larger sheave body 102.

Figure 2:
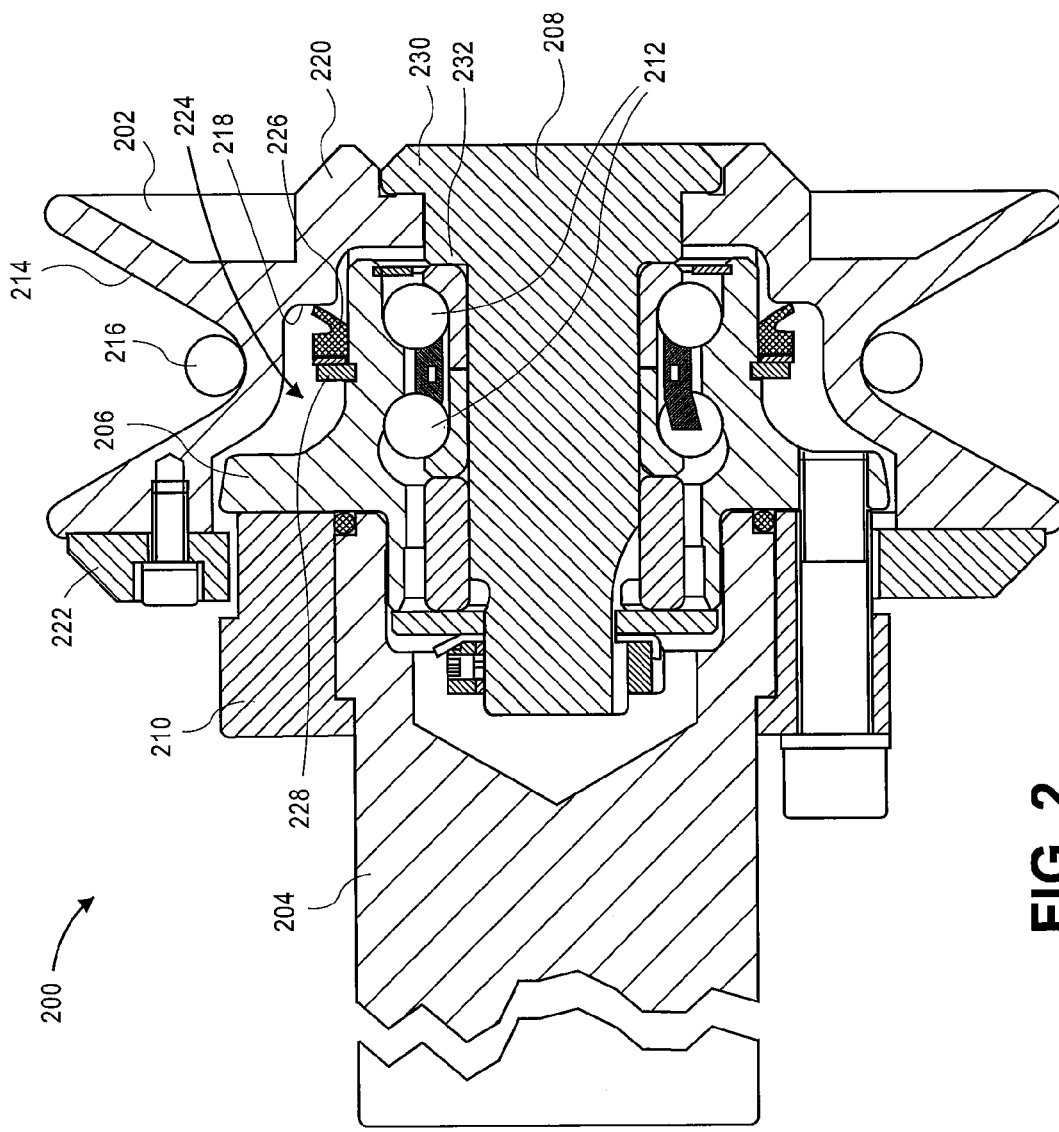
FIG. 2 illustrates a side, cross-sectional view of another sheave assembly, according to an embodiment.

FIG. 2 illustrates a side, cross-sectional view of another sheave assembly 200 that is similar to the sheave assembly 100, according to an embodiment. Like the sheave assembly 100, the sheave assembly 200 may include a sheave body 202, shaft 204, hub 206, and axle 208. The hub 206 may be coupled with the shaft 204 via a retaining ring 210 disposed at least partially around the shaft 204. The axle 208 may be rotatably supported in and by the hub 206 via bearing elements 212.

The sheave body 202 may include a groove 214 configured to receive a force transmitting member 216 (e.g., a rope) therein and may rotate in response to movement of the force-transmitting member 216. The sheave body 202 may also include an inner shoulder 218 and an inner ring 220. As shown, the inner ring 220 may be axially offset from the groove 214.

Further, the sheave assembly 200 may also include an adapter 222, which may be, for example, spaced radially outward from the retaining ring 210 and coupled with the sheave body 202. The sheave body 202 and the hub 206 may be spaced apart, e.g., axially and radially, such that a flowpath 224 is defined therebetween. The flowpath 224 may extend to the bearing elements 212 on one side, and past the hub 206, between the adapter 222 and the retaining ring 210, and to an exterior of the assembly 200. In an embodiment, the bearing elements 212 may include a seal such that the bearing elements 212 are at least partially sealed between the hub 206 and the axle 208; however, the flowpath 224 may still be considered to extend to the bearing elements 212.

The sheave assembly 200 may thus include a seal 226 in the flowpath 224, e.g., extending between and sealing with the hub 206 and the sheave body 202. The seal 226 may be resiliently and axially compressed between a stop ring 228 coupled with or integral to the hub 206 on one axial side, and an axially-facing surface of the inner shoulder 218 of the sheave body 202 on an opposite axial side, so as to maintain a sealing contact.

The axle 208 may also include a flange 230, which may be axially offset from the hub 208 and/or the bearing elements 212. The axle 208 may also include a retaining shoulder 232, so as to retain the position of the bearing elements 212 within the hub 206. The inner ring 220 of the sheave body 202 may bear against and/or be coupled with the flange 230. For example, the inner ring 220 may be disposed axially between the hub 206 and/or bearing elements 212 and the flange 230.

In operation, movement of the force-transmitting member 216 may drive the sheave body 202 to rotate. Since the axle 208 is coupled with the sheave body 203, it too may rotate, and may be supported in this rotation by the hub 206 via the bearing elements 212. The seal 226 may prevent egress of the lubricant for the bearing elements 212, as well as preventing ingress of corrosive and/or otherwise contaminating elements into the bearing elements 212 via the flowpath 224. Further, the adapter 222, positioned around the retaining ring 210 and potentially in close but non-touching proximity thereto, may reduce the size of the opening to the flowpath 224 that is exposed to the exterior of the assembly 100, which may reduce a sealing load on the seal.

Accordingly, both the sheave assembly 100 and the sheave assembly 200 may provide a sealed bearing assembly for a sheave body 202 to rotate, which may reduce maintenance and enhance operating capabilities, lifetime, etc. In addition, the sheave assemblies 100, 200 may be employed in retrofitting situations, allowing the hub 106, 206, axle 108, 208 and other components that support the rotation of the sheave bodies 102, 202, to be employed over a range of sizes for the sheave body 102, 202. For example, the adapter 110 may allow for use of the assembly 100 with sheave bodies 102 with relatively large inner diameters, while the adapter 222 may allow for use of the assembly 200 with sheave bodies 202 with offset inner rings 220 and/or smaller inner diameters. It will be appreciated, however, that these are but two examples of how the sheave assemblies 100, 200 might be implemented, among many contemplated, and thus should not be considered limiting.

Figure 3:
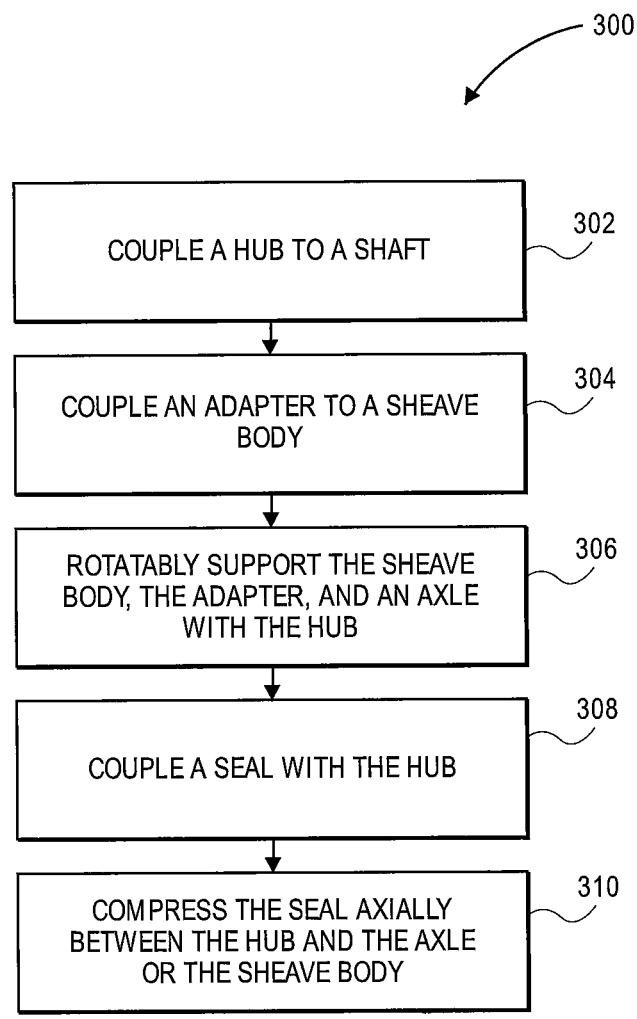
FIG. 3 illustrates a flowchart of a method for assembling a sheave for rotatably supporting a force-transmitting member, according to an embodiment.

FIG. 3 illustrates a method 300 for assembling a sheave for rotatably carrying a force-transmitting member, such as a rope or cable, according to an embodiment. Conducting some embodiments of the method 300 may result in an embodiment of the sheave assemblies 100 and/or 200; however, other embodiments of the method 300 may result in other structures.

The method 300 may include coupling a hub to a shaft, such that the hub is stationary with respect to the shaft, as at 302. The method 300 may also include coupling an adapter to a sheave body, as at 304. The method 300 may further include rotatably supporting the sheave body, the adapter, and an axle coupled with the sheave body or coupled with the adapter, using bearing elements coupled with the hub, as at 306.

A flowpath may be defined at least partially by the hub and the adapter, as well as potentially being defined by the sheave body and/or the axle. The flowpath may extend from an exterior of the sheave to the bearing elements. The method 300 may thus additionally, in some embodiments, include coupling a seal with the hub, as at 308, and compressing the seal axially, as at 310, e.g., between the hub and the flange or a shoulder of the sheave body. Moreover, the adapter may be coupled with a flange of the axle to connect the sheave body with the axle, or the adapter may be received around the shaft and may at least partially cover an opening of the flowpath to the exterior of the sheave.

The foregoing description of the present disclosure, along with its associated embodiments and examples, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments.

Moreover, in the foregoing description, locating a first feature over, on, or coupled to a second feature may include embodiments in which the first and second features are formed in direct contact, and may also include embodiments in which additional features may be formed interposing the first and second features, such that the first and second features may not be in direct contact. Finally, the various embodiments presented above may be combined in any combination of ways, i.e., any element from one embodiment may be used in any other embodiment, without departing from the scope of the disclosure.

I claim:

1. A sheave assembly comprising:
   a hub;
   an axle;
   a bearing element disposed between the axle and the hub;
   a sheave body disposed at least partially around the hub; and
   an adapter coupled with the sheave body and the axle, such that the axle, the sheave body, and the adapter rotate as a single unit with respect to the axle, wherein the adapter is positioned at least partially around the hub and spaced radially outwards therefrom, such that the adapter and the hub at least partially define a flowpath radially therebetween, wherein the flowpath extends to the bearing element.

2. The sheave assembly of claim 1, further comprising a seal that engages the hub and is configured to at least partially seal the flowpath.

3. The sheave assembly of claim 2, wherein the flowpath is at least partially defined by the axle, the seal additionally engaging the axle to seal the flowpath.

4. The sheave assembly of claim 2, wherein the seal engages the hub and the sheave body to seal the flowpath.

5. The sheave assembly of claim 1, wherein the adapter is coupled with the axle.

6. The sheave assembly of claim 1, further comprising a shaft, wherein the hub is coupled with the shaft, such that the hub is stationary with respect to the shaft.

7. The sheave assembly of claim 1, wherein the axle comprises a flange that is axially offset from the hub and the bearing element, and wherein the sheave body comprises an inner ring, the adapter being coupled with the flange and the inner ring.

8. The sheave assembly of claim 7, wherein the adapter comprises an axial extension that extends axially along an inner diameter of the inner ring, the axial extension defining at least a portion of the flowpath.

9. The sheave assembly of claim 8, wherein the adapter is coupled to the flange such that the flange is disposed between the adapter and the hub.

10. The sheave assembly of claim 1, wherein the axle comprises a flange that is axially offset from the bearings and the hub, wherein the sheave body is coupled with the flange such that the sheave body is disposed axially between the flange and the bearings.

11. The sheave assembly of claim 1, further comprising a shaft coupled with the hub such that the hub is stationary with respect to the shaft, wherein the adapter is positioned at least partially around the shaft.

12. The sheave assembly of claim 11, further comprising a retaining ring disposed around the shaft and coupled with the hub, wherein the adapter is positioned at least partially around the retaining ring.

13. The sheave assembly of claim 11, wherein the hub comprises an outer raceway engaging the bearing element, the outer raceway being integral with a remainder of the hub.

14. An apparatus for carrying a rope, the apparatus comprising:
    a shaft;
    a hub coupled with the shaft so as to be stationary with respect thereto;
    an axle disposed at least partially within the hub;
    a plurality of bearing elements disposed between the hub and the axle, to rotatably support the axle with respect to the hub;
    an adapter coupled with the sheave body and the axle, such that the axle, the sheave body, and the adapter rotate as a single unit with respect to the axle, wherein the adapter is positioned at least partially around the hub and spaced radially outwards therefrom, such that the adapter and the hub at least partially define a flowpath radially therebetween, wherein the flowpath extends to the bearing elements; and
    a seal disposed in the flowpath and sealing the flowpath.

15. The apparatus of claim 14, wherein the seal engages the hub and a flange of the axle to seal the flowpath.

16. The apparatus of claim 15, wherein the adapter is coupled with the flange.

17. The apparatus of claim 14, wherein the adapter is disposed at least partially around the shaft and the sheave body is coupled directly to a flange of the axle.

* * * * *